(12) United States Patent
Klassen (10) Patent No.: US 10,156,203 B2
(45) Date of Patent: Dec. 18, 2018

(54) ENERGY TRANSFER MACHINES

(71) Applicant: 1158988 BC Ltd., Langley (CA)

(72) Inventor: James B. Klassen, Langley (CA)

(73) Assignee: 1158988 BC Ltd., Langley (CA)

(*) Notice: Subject to any disclaimer, the term of this patent is extended or adjusted under 35 U.S.C. 154(b) by 0 days.

(21) Appl. No.: 15/237,143

(22) Filed: Aug. 15, 2016

(65) Prior Publication Data

US 2017/0030294 A1 Feb. 2, 2017

Related U.S. Application Data

(63) Continuation of application No. 13/378,977, filed as application No. PCT/CA2010/000881 on Jun. 16, 2010, now Pat. No. 9,435,291.

(60) Provisional application No. 61/187,308, filed on Jun. 16, 2009.

(51) Int. Cl.
| | |
|---|---|
| *F02G 1/043* | (2006.01) |
| *F02G 1/044* | (2006.01) |
| *F02G 1/05* | (2006.01) |
| *H02K 7/18* | (2006.01) |

(52) U.S. Cl.
CPC .......... *F02G 1/0435* (2013.01); *F02G 1/044* (2013.01); *F02G 1/05* (2013.01); *H02K 7/1876* (2013.01)

(58) Field of Classification Search
CPC .............. F03G 7/04; F03G 7/05; F03G 7/06
See application file for complete search history.

(56) References Cited

U.S. PATENT DOCUMENTS

| | | | |
|---|---|---|---|
| 1,306,865 A | | 6/1919 | Stoddard |
| 2,988,874 A | | 1/1961 | Ray et al. |
| 3,698,182 A | | 10/1972 | Knoos |
| 3,767,325 A | * | 10/1973 | Schuman .............. F02G 1/0435 417/207 |
| 3,782,859 A | * | 1/1974 | Schuman ................ F01B 11/00 417/207 |
| 3,797,247 A | | 3/1974 | Schwartzman |
| 3,861,166 A | | 1/1975 | Goldsberry |
| 3,956,894 A | | 5/1976 | Tibbs |
| 3,988,901 A | | 11/1976 | Shelton et al. |
| 3,990,243 A | | 11/1976 | Davoud |
| 3,996,745 A | * | 12/1976 | Davoud .................. F02G 1/044 60/517 |

(Continued)

FOREIGN PATENT DOCUMENTS

| | | |
|---|---|---|
| CA | 1305155 | 7/1992 |
| CA | 2 635 336 A1 | 12/2008 |

(Continued)

OTHER PUBLICATIONS

International Search Report dated Oct. 8, 2010, issued in corresponding International Application No. PCT/CA2010/000881 filed Jun. 16, 2010, 5 pages.

(Continued)

*Primary Examiner* — Mark Laurenzi
*Assistant Examiner* — Shafiq Mian
(74) *Attorney, Agent, or Firm* — Seed Intellectual Property Law Group LLP (57) ABSTRACT

A novel engine for producing power from a temperature differential with additional benefits of low cost, high efficiency, quiet operation minimal wear of components, and the ability to produce power or cooling from low grade heat sources.

10 Claims, 3 Drawing Sheets

(56) References Cited

U.S. PATENT DOCUMENTS

| | | | |
|---|---|---|---|
| 4,009,587 A | 3/1977 | Robinson, Jr. et al. | |
| 4,031,704 A * | 6/1977 | Moore | F03G 7/06 |
| | | | 417/379 |
| 4,072,010 A | 2/1978 | Schuman | |
| 4,077,221 A | 3/1978 | Maeda | |
| 4,132,505 A | 1/1979 | Schuman | |
| 4,195,481 A | 4/1980 | Gregory | |
| 4,215,548 A | 8/1980 | Beremand | |
| 4,269,040 A | 5/1981 | Grundmann et al. | |
| 4,353,212 A | 10/1982 | Adler | |
| 4,476,681 A | 10/1984 | Dineen | |
| 4,578,956 A | 4/1986 | Young | |
| 4,617,801 A | 10/1986 | Clark, Jr. | |
| 4,747,271 A * | 5/1988 | Fischer | F01B 29/12 |
| | | | 60/650 |
| 4,765,144 A | 8/1988 | Spacer | |
| 4,779,427 A * | 10/1988 | Rowley | F02G 1/04 |
| | | | 62/116 |
| 4,816,121 A | 3/1989 | Keefer | |
| 5,336,059 A | 8/1994 | Rowley | |
| 5,414,997 A | 5/1995 | Tailer | |
| 5,465,579 A * | 11/1995 | Terada | F02G 1/043 |
| | | | 60/520 |
| 5,467,600 A | 11/1995 | Kuroiwa | |
| 5,468,879 A * | 11/1995 | Chandraratna | C07D 215/12 |
| | | | 549/23 |
| 5,537,823 A | 7/1996 | Vogel | |
| 5,737,925 A | 4/1998 | Sekiya et al. | |
| 5,924,305 A | 7/1999 | Hill | |
| 6,735,946 B1 | 5/2004 | Otting et al. | |
| 6,874,321 B2 | 4/2005 | Ogura | |
| 7,134,279 B2 | 11/2006 | White et al. | |
| 7,260,931 B2 * | 8/2007 | Egelja | E02F 9/2203 |
| | | | 60/422 |
| 7,331,180 B2 | 2/2008 | Marnoch | |
| 7,603,858 B2 | 10/2009 | Bennett | |
| 8,459,028 B2 | 6/2013 | Klassen et al. | |
| 8,997,789 B2 * | 4/2015 | Pozniak | F17D 5/02 |
| | | | 137/215 |
| 9,091,490 B2 * | 7/2015 | Weinstein | F28D 15/025 |
| 2004/0164022 A1 | 8/2004 | Solomon | |
| 2007/0089410 A1 | 4/2007 | Yoshimura et al. | |
| 2009/0133397 A1 | 5/2009 | Owens et al. | |
| 2009/0165461 A1 | 7/2009 | Klassen et al. | |
| 2009/0301548 A1 * | 12/2009 | Wang | H02S 10/10 |
| | | | 136/248 |
| 2010/0061872 A1 | 3/2010 | Sakamoto et al. | |
| 2011/0168495 A1 * | 7/2011 | Subramaniam | F03D 11/0008 |
| | | | 184/6.12 |
| 2014/0290278 A1 * | 10/2014 | Dunn | F25B 9/06 |
| | | | 62/6 |

FOREIGN PATENT DOCUMENTS

| | | | |
|---|---|---|---|
| DE | 197 51 050 A1 | 5/1999 | |
| GB | 2 333 131 A | 7/1999 | |
| WO | 2007/143894 A1 | 12/2007 | |
| WO | WO 2007143894 A1 * | 12/2007 | H02S 10/10 |
| WO | 2008/154730 A1 | 12/2008 | |

OTHER PUBLICATIONS

English Translation of German Office Action for DE 11 2008 001 613.5 dated Mar. 29, 2018, 13 pages.

* cited by examiner

ENERGY TRANSFER MACHINES

TECHNICAL FIELD

This relates to the technical field of energy transfer, and in particular relates to cold cycle engines, and heating and cooling pumps.

BACKGROUND

A conventional heat engine, such as a Stirling engine, is able to produce power from an external heat source. The heat source may be low cost or free, such as waste heat from a manufacturing process, but the Stirling cycle itself requires a heavy and expensive engine resulting in prohibitive cost and weight for many applications. Another limitation of the Stirling engine is that working fluid must be heated and cooled with every cycle of the engine. This limits the speed at which the engine can operate and requires sophisticated heat exchangers.

Other conventional heat engines, such as steam engines that use the Rankine cycle, require the working fluid in the engine to change phases during operation of the engine. For a particular operating fluid, such as water, the engine requires a heat source at a temperature at over the boiling point of the operating fluid, 100 degrees Celsius for water, in order for the fluid to change to steam during the Rankine cycle. The Rankine cycle is not easily implemented in applications where the temperature at the heat source changes over time or where only small variations in temperature are available to operate the engine.

The inventor has previously proposed a cold cycle engine in PCT application no. PCT/CA2008/001149, published as no. WO2008/154730 published Dec. 24, 2008 and in US published application no. 2009-0165461 published Jul. 2, 2009. The cold cycle engine disclosed in those applications comprised passageways defining a path and containing a compressible fluid, which is at least in part pressurized above atmospheric pressure during normal operational conditions. The compressible fluid has a constant phase in the path. A pressure-displacement coupled interface is on the path and divides the path into a first energy transfer circuit and a second energy transfer circuit. In operation, the first energy transfer circuit and second energy transfer circuit have differential pressure, with one at higher pressure than the other. Depending on time of operation, this pressure differential may be reversed. First flow control devices on the first energy transfer circuit are coordinated to permit pulsed flow through the first energy transfer circuit with energy transfer through the pressure-displacement coupled interface. Second flow control devices on the second energy transfer circuit are coordinated to permit pulsed flow through the second energy transfer circuit with energy transfer through the pressure-displacement coupled interface. The first flow control devices and the second flow devices are coordinated to allow the pulsed flows in the first energy transfer circuit and the second energy transfer circuit to combine to create flow around the path. An input-output device is coupled to the pressure-displacement coupled interface to input energy into or extract energy from the pressure-displacement coupled interface.

SUMMARY

In a cold cycle engine according to one embodiment disclosed here, passageways define an open path and contain a compressible fluid. A pressure-displacement coupled interface is on the open path and divides the open path into a first energy transfer circuit and a second energy transfer circuit. In operation, the first energy transfer circuit and second energy transfer circuit have differential pressure, with one at higher pressure than the other. Depending on time of operation, this pressure differential may be reversed. First flow control devices on the first energy transfer circuit are coordinated to permit pulsed flow through the first energy transfer circuit with energy transfer through the pressure-displacement coupled interface. Second flow control devices on the second energy transfer circuit are coordinated to permit pulsed flow through the second energy transfer circuit with energy transfer through the pressure-displacement coupled interface. The first flow control devices and the second flow devices are coordinated to allow the pulsed flows in the first energy transfer circuit and the second energy transfer circuit to combine to create flow around the open path. An input-output device is coupled to the pressure-displacement coupled interface to input energy into or extract energy from the pressure-displacement coupled interface.

In a further embodiment, the passageways may define a closed path and the fluid may be a liquid that is incompressible in relation to a gas. Volume changes in the fluid may be accommodated by accumulators or expandable tubing acting as accumulators. In a further embodiment, a pressure-displacement coupled interface is used to convert electrical energy into gas pressure or gas pressure into electrical energy.

An energy transfer machine is disclosed, comprising: passageways defining a path and containing a fluid; a pressure-displacement coupled interface on the path dividing the path into a first energy transfer circuit and a second energy transfer circuit, the first energy transfer circuit having a heat source or being connectable to a heat source and the second energy transfer circuit being connectable to a heat sink; first flow control devices on the first energy transfer circuit coordinated to permit pulsed flow through the first energy transfer circuit with energy transfer through the pressure-displacement coupled interface; second flow control devices on the second energy transfer circuit coordinated to permit pulsed flow through the second energy transfer circuit with energy transfer through the pressure-displacement coupled interface; the first flow control devices and the second flow control devices being coordinated to allow the pulsed flows in the first energy transfer circuit and the second energy transfer circuit to combine to create flow around the path; and an input-output device coupled to the pressure-displacement coupled interface to at least one of input energy into and extract energy from the pressure-displacement coupled interface, in which either the second energy transfer circuit is an open circuit or the flow path contains a liquid.

In various embodiments, there may be included any one or more of the following features:

There may be a different pressure in the first energy transfer circuit than in the second energy transfer circuit.

If the second energy transfer circuit is not an open circuit, the path may be pressurized.

There may be an accumulator on the first energy transfer circuit to accommodate pressure variation in the first energy transfer circuit;

There may be an accumulator on the second energy transfer circuit to accommodate pressure variation in the second energy transfer circuit;

The pressure-displacement coupled interface may comprise a piston or diaphragm contained within a conduit extending between sides of the path at different pressure.

The pressure-displacement coupled interface may comprise a piston or diaphragm having equal surface area at each end of the piston or diaphragm against which compressible fluid exerts pressure.

The pressure-displacement coupled interface may comprise a free piston.

There may be a control system configured to send control signals to the first flow control devices and to the second flow control devices, the first flow control devices and the second flow control devices controlling flow in response to control signals from the control system.

The energy transfer machine may be operated to take advantage of heat differentials between night and day.

An energy transfer machine is also disclosed, comprising: passageways defining a path and containing a fluid; a pressure-displacement coupled interface on the path dividing the path into a first energy transfer circuit and a second energy transfer circuit, with different pressure in the first energy transfer circuit than in the second energy transfer circuit, the second energy transfer circuit comprising an open circuit; first flow control devices on the first energy transfer circuit coordinated to permit pulsed flow through the first energy transfer circuit with energy transfer through the pressure-displacement coupled interface; second flow control devices on the second energy transfer circuit coordinated to permit pulsed flow through the second energy transfer circuit with energy transfer through the pressure-displacement coupled interface; the first flow control devices and the second flow control devices being coordinated to allow the pulsed flows in the first energy transfer circuit and the second energy transfer circuit to combine to create flow around the path; and an input-output device coupled to the pressure-displacement coupled interface to at least one of input energy into and extract energy from the pressure-displacement coupled interface.

In various embodiments, there may be included any one or more of the following features:

The pressure-displacement coupled interface may comprise a piston or diaphragm contained within a conduit extending between sides of the path at different pressure.

The piston or diaphragm has may have equal surface area at each end of the piston or diaphragm against which compressible fluid exerts pressure.

The pressure-displacement coupled interface may comprise a free piston.

The energy transfer machine may be operated to take advantage of heat differentials between night and day.

An energy transfer machine is also disclosed, comprising: passageways defining a path and containing a liquid; a pressure-displacement coupled interface on the path dividing the path into a first energy transfer circuit and a second energy transfer circuit; first flow control devices on the first energy transfer circuit coordinated to permit pulsed flow through the first energy transfer circuit with energy transfer through the pressure-displacement coupled interface; second flow control devices on the second energy transfer circuit coordinated to permit pulsed flow through the second energy transfer circuit with energy transfer through the pressure-displacement coupled interface; a first accumulator on the first energy transfer circuit to accommodate pressure variation in the first energy transfer circuit; a second accumulator on the second energy transfer circuit to accommodate pressure variation in the second energy transfer circuit; the first flow control devices and the second flow control devices being coordinated to allow the pulsed flows in the first energy transfer circuit and the second energy transfer circuit to combine to create flow around the path; and an input-output device coupled to the pressure-displacement coupled interface to at least one of input energy into and extract energy from the pressure-displacement coupled interface.

In various embodiments, there may be included any one or more of the following features:

The path may be pressurized with different pressure in the first energy transfer circuit than in the second energy transfer circuit.

The pressure-displacement coupled interface may comprise a piston or diaphragm contained within a conduit extending between sides of the path at different pressure.

The path may be a closed path.

The pressure-displacement coupled interface may comprise a free piston.

The energy transfer machine may be operated to take advantage of heat differentials between night and day.

An energy transfer machine is also disclosed, comprising: a pressure-displacement coupled interface comprising a sealed pressure chamber comprising a cylinder, the cylinder having a hot end and a cold end, and a movable element placed for reciprocal motion within the cylinder, the movable element separating the hot end of the cylinder from the cold end of the cylinder; an electrical input-output device coupled to the movable element for converting the reciprocal motion of the movable element into electrical energy or converting electrical energy into motion of the movable element; a hot circuit and a cold circuit, the hot circuit and cold circuit being connected through the cylinder, at least one of the hot circuit and the cold circuit comprising an open path; and a plurality of valves, comprising: a hot inlet valve lying on the hot end of the cylinder and forming an activatable fluid seal between the hot circuit and the hot end of the cylinder; a hot discharge valve lying on the hot end of the cylinder and forming an activatable fluid seal between the cold circuit and the hot end of the cylinder; a cold inlet valve lying on the cold end of the cylinder and forming an activatable fluid seal between the cold circuit and the cold end of the cylinder; and a cold discharge valve lying on the cold end of the cylinder and forming an activatable a fluid seal between the hot circuit and the cold end of the cylinder.

In various embodiments, there may be included any one or more of the following features:

The energy transfer machine may have a control system configured to send control signals to the plurality of valves, the plurality of valves opening and closing in response to control signals from the control system.

The movable element may comprise a piston or diaphragm.

If the movable element comprises a piston, the piston may have ends with equal surface area.

The movable element may comprise a free piston.

The energy transfer machine may have a first rebound spring and a second rebound spring, the first rebound spring lying within the cylinder between the hot end of the cylinder and the free piston and the second rebound spring lying with the cylinder between the cold end of the cylinder and the free piston.

The energy transfer machine may have a heat differential between the hot circuit and the cold circuit provided by any one or more of the following: a naturally occurring heat differential, waste heat from an industrial process, expended heating from combusting fuels, temperature difference between day and night, difference in temperature between sub-ground and ambient air, difference in temperature between a water surface and water below surface, and the difference in temperature between solar heated and shaded areas in space.

The energy transfer machine may be operated to take advantage of heat differentials between night and day.

An energy transfer machine is also disclosed comprising: a pressure chamber comprising a cylinder, the cylinder having a first end and a second end, and a pressure responsive element placed for reciprocal motion within the cylinder, the pressure responsive element separating the first end of the cylinder from the second end of the cylinder; an input-output device coupled to the pressure responsive element for converting the reciprocal motion of the pressure responsive element into electrical energy or electrical energy into reciprocal motion of the pressure responsive element; a high pressure zone communicating with the cylinder through a first high pressure valve on the first end of the cylinder and a second high pressure valve on the second end of the cylinder; a low pressure zone communicating with the cylinder through a first low pressure valve on the first end of the cylinder and a second low pressure valve on the second end of the cylinder; and the first high pressure valve, the second high pressure valve, the first low pressure valve and the second low pressure valve being operable to convert pressure in the high pressure zone into electrical energy produced by motion of the pressure responsive element or to convert electrical energy into motion of the pressure responsive element that pressurizes the high pressure zone.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims. In this patent document, the terms hot and cold are used as relative terms indicating that the hot side is a higher temperature than the cold side. Similarly, a heat source is an object that has a higher relative temperature than the object that is receiving energy from the heat source.

Energy transfer machines are disclosed that convert a change of heat energy of a compressible or incompressible fluid to motion of an interface or that converts motion of an interface to a change of heat energy. The motion of the interface may be used to do work in a variety of ways, such as to drive a machine, as for example a pump, or electrical generator. The energy transfer machine may also use energy such as electrical energy or mechanical energy to cause motion of an interface that acts on a fluid to change the pressure and/or heat energy of the fluid.

In various embodiments, the compressible fluid is contained within passageways that define a path. The passageways may be defined by any suitable material and may comprise a variety of constructions such as tubing, piping, channels or holes bored in substrates, channels etched in one substrate with another substrate forming a cap for the channel, channels or holes in semi-conductor chips or any other suitable passageways. Fluid flow in heat exchangers or other parts of the flow path may divide into separate channels or remain in a single channel as in the drawings.

The closed path in different embodiments may include additional features such as heat exchangers, condensers, accumulators, heat sources, heat sinks and hot or cold reservoirs, which also may function as heat exchangers.

A pressure-displacement coupled interface on the flow path divides the flow path into a first energy transfer circuit and a second energy transfer circuit. The pressure-displacement coupled interface also transfers energy from one energy transfer circuit to the other energy transfer circuit. The pressure-displacement coupled interface may take any of various forms. The pressure-displacement coupled interface is displaced in response to pressure changes on each side of the path and as a consequence moves in response to pressure fluctuations or imbalances in the path. The pressure-displacement coupled interface may be formed of one or more parts that are coupled together. In one embodiment, the pressure-displacement coupled interface comprises a passageway or conduit forming a short circuit across the path with a moving or movable element such as a free piston or diaphragm in the passageway. Pressure differentials across the path cause the free piston or diaphragm to move through the conduit. Depending on the process conditions, the free piston or diaphragm may move with varying amounts of displacement.

In another embodiment, the pressure-displacement coupled interface may comprise a conduit with a pair of pistons that are coupled together in any of various ways so that the motion of one piston is coordinated with the motion of the other piston. The pistons may for example be coupled by a rod, or through an electrical interface. In another embodiment, the pressure-displacement coupled interface may comprise multiple conduits, each conduit having one or more coupled pistons or diaphragms inside that respond to pressure differentials in the fluid path.

The first energy transfer circuit comprises the path on one side of the pressure-displacement coupled interface and the second energy transfer circuit comprises the path on the other side of the pressure-displacement coupled interface. In some embodiments, the first energy transfer circuit may pass through a heat source and the second energy transfer circuit may pass through a heat sink. The energy transfer circuits operate in a pulsed manner as flow control devices restrict or allow flow. While one of the energy transfer circuits operates, the other may be static for part of that operation.

Pressure differentials in the path are controlled by flow control devices. In some embodiments, the flow control devices may comprise valves, such as rotary valves, piezoelectric valves, or other suitable valves. The flow control devices on the first energy transfer circuit are coordinated to permit pulsed flow through the first energy transfer circuit with energy transfer through the pressure-displacement coupled interface. Flow control devices on the second energy transfer circuit are coordinated to permit pulsed flow through the second energy transfer circuit with energy transfer through the pressure-displacement coupled interface. The flow control devices are coordinated to allow the pulsed flows in the first energy transfer circuit and the second energy transfer circuit to combine to create flow around the path.

In one embodiment, the energy transfer machine is operated to convert heat energy to motion. In this instance, the energy source is a heat differential between some part of the first energy transfer circuit and some part of the second energy transfer circuit. Consider the first energy transfer circuit to be the hotter side, namely the hot circuit. The second energy transfer circuit is the cold circuit. In one embodiment, the hot circuit has an inlet flow control device adjacent the pressure-displacement coupled interface on one side of the path that allows pressure from the hot circuit to press against part of the pressure-displacement coupled interface. In the case of the free piston, this may be one side of the free piston. The hot circuit has a discharge flow control device adjacent the pressure-displacement coupled interface on the other side of the path. The cold circuit has corresponding inlet and discharge flow control devices on opposed sides of the pressure-displacement coupled interface.

An input-output device is coupled to the pressure-displacement coupled interface to input energy into or extract energy from the pressure-displacement coupled interface. For example, the input-output device may be an alternator. In one embodiment, the alternator may be operated to convert motion of a moving part of the pressure-displacement coupled interface, such as movement of a free piston, into electrical energy. In another embodiment, the alternator may be operated to cause movement of a moving part of the pressure-displacement coupled interface and drive fluid around the path. In another embodiment, a piston is caused to rotate as it is oscillating in a conduit forming a cylinder between opposed sides of the path and is equipped with fluid flow ports so some or all of the fluid flow control is provided by the spinning piston as it interacts with fluid flow ports on the cylinder. In another embodiment, the input-output device may comprise a mechanical coupling to a motor or pump.

Figure 1:
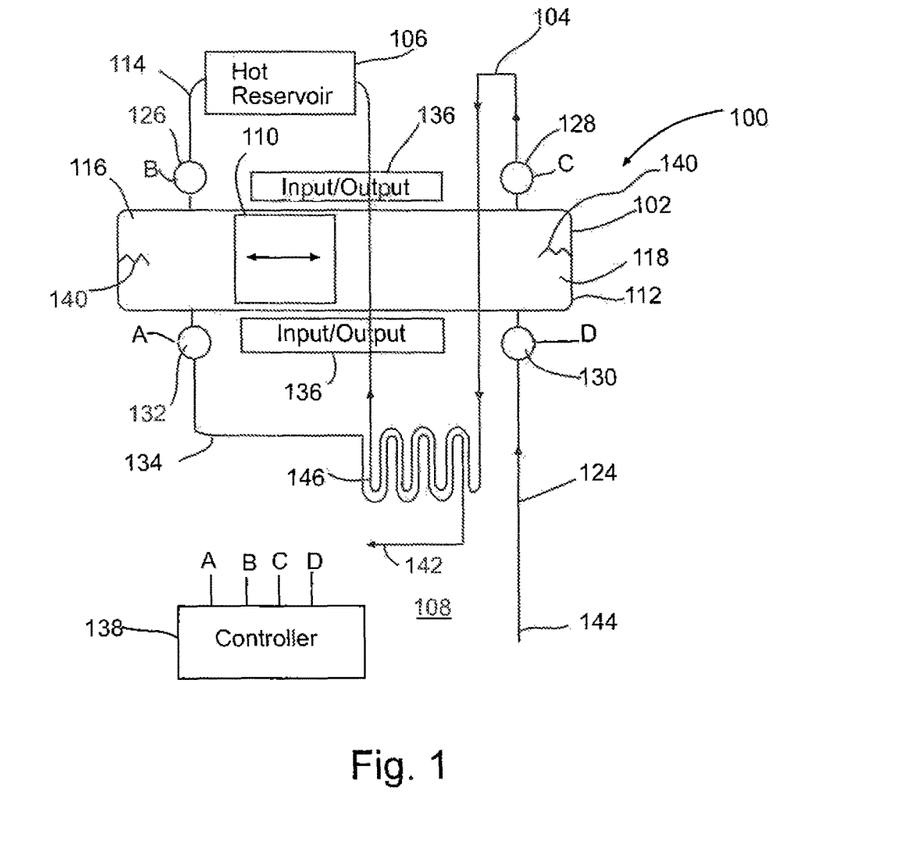
FIG. 1 is a schematic of a first embodiment of an energy transfer machine with an open path.

In FIG. 1 a first embodiment of an energy transfer machine 100 is shown. The energy transfer machine 100 has a body 102, which is connected to a hot reservoir 106 via passageways 104 and 114 and a cold reservoir 108 through passageways 124 and 134. The cold reservoir may be ambient atmosphere accessed through a fresh air intake 144 and a fresh air discharge 142. The hot reservoir 106 may be a heat exchanger. A piston or diaphragm 110 or other device that responds to pressure with movement lies in a cylinder 112 in the interior of the body 102. On opposite sides of the piston are a hot end 116 of the cylinder 112 and a cold end 118 of the cylinder 112. A hot fluid inlet valve 126 separates the hot end 116 of the cylinder 112 from the hot reservoir 106. A cold fluid discharge valve 128 separates the cold end 118 of the cylinder 112 from the hot reservoir 106. A cold fluid inlet valve 130 separates the cold end 118 of the cylinder 112 from the cold reservoir 108. A hot fluid discharge valve 132 separates the hot end 116 of the cylinder 112 from the cold reservoir 108. The piston 110 shown in FIG. 1 is a free piston and may be fitted with permanent magnets (not shown) embedded within the piston 110. An input-output device 136, which may comprise electromagnetic coils, may be embedded into the body 102 of the energy transfer machine 100.

The energy transfer machine 100 operates as follows in one embodiment, in similar manner to the embodiment disclosed in US publication no. 2009-0165461, except that the cold circuit is open. Compressible fluid passes through the hot reservoir 106 and the cold reservoir 108 during operation of the energy transfer machine 100. The hot and cold reservoirs 106 and 108 and passageways 104, 114, 124 and 134 function as energy transfer circuits with the piston 110 alternately acting as part of either the hot reservoir 106 or the cold reservoir 108 as fluid flows through the energy transfer machine 100. The hot and cold reservoirs 106, 108, and passageways 104, 114, 124 and 134 together form a path of fluid flow that includes flow through the body 102. The hot reservoir receives heat from a heat source (not shown) so that fluid that is discharged from the hot reservoir 106 has a higher temperature than fluid entering the hot reservoir 106. The hot energy transfer circuit may include a portion of the flow path that interacts with flow in the cold energy transfer circuit at a heat exchanger or regenerator 146 to transfer waste heat from the discharge at 142 to fluid entering the hot circuit to thus reduce the heating requirements of the hot reservoir 106. The energy transfer machine may operate without the regenerator. The kinetic energy of the piston 110 is increased when a controlled mass of hot fluid is allowed to enter the hot end 116 of the cylinder 112 from the hot reservoir 106. The mass of hot fluid enters the cylinder 112 through the hot fluid inlet valve 126, thereby acting on the piston 110 and causing it to move axially within the cylinder 112. When a desired mass of hot fluid has entered the cylinder 112, the hot fluid inlet valve 126 closes. Movement of the piston may be used to create externally useful work such as by generating electricity with input-output device 136.

The kinetic energy of the moving piston is converted into increased pressure energy in the fluid in the cold end of the cylinder. The movement of the piston 110 pushes compressible fluid from the cold end 118 of the cylinder into the hot reservoir 106 through a cold fluid discharge valve 128. The valve 128 opens as the pressure in the cylinder end 118 approximately equals the pressure in the hot reservoir 106 to avoid throttling across the valve. When operating in a steady state condition, the mass of cold fluid that is pushed back into the hot reservoir 106 is approximately equal to the mass of hot fluid that was introduced into the cylinder 112 during the previous phase. Compression of the cold fluid in the cold end 118 of the cylinder 112 requires less energy than is produced by the pressure and expansion of the hot fluid in the hot end 116 of the cylinder 112, which provides energy to overcomes parasitic loses in the system.

The cold fluid discharge valve 128 is then closed, and the piston 110 will continue to move axially in the same direction until pressurization of the sealed fluid in the cold end 118 of the cylinder causes the piston 110 to stop and move in the opposite direction with conservation of a portion of the kinetic energy produced in the previous phase. Pressurized fluid 120 created by the movement of the piston 110 causes the piston 110 to bounce back towards the hot end 116 of the cylinder 112.

When the piston changes direction and begins a second stroke, and when the pressure in the cold end 118 of the cylinder 112 approximately equals the pressure in the cold reservoir 108, the cold fluid inlet valve 130 opens and allows cold fluid to be drawn in from the cold reservoir 108. When approximately the same mass of cold fluid as was expelled through the cold fluid discharge valve 128 is drawn into the cold end 118 of the cylinder, the cold fluid inlet valve 130 closes.

When the hot fluid inlet valve 126 closes, the pressure in the hot end 116 of the cylinder 112 drops. As the piston 110 changes direction and begins the second stroke, the pressure in the hot end 116 of the cylinder 112 increases. When the pressure in the hot end 116 of the cylinder 112 reaches approximately the same pressure as the cold reservoir 108, the hot fluid discharge valve 132 opens and discharges approximately the same mass of fluid that was originally introduced into the hot end 116 of the cylinder 112. This is an example of operation at a steady state.

The hot fluid discharge valve 126 then closes and pressure builds in the hot end 116 until the piston stops, changes directions and another cycle begins again. Pressurized fluid 122 created by the movement of the piston 110 causes the piston 110 to bounce back towards the cold end 118 of the cylinder 112.

A computerized control system 138 may monitor the pressure in the hot and cold reservoirs 106, 108 and the axial position of the piston. The processor may determine the timing of the opening and closing of the valves through paired input-output ports A, B, C and D and the amount of current to be drawn from the electromagnetic coils of the input-output device 136. Any of various commercially available valve controllers may be used to control the valves. In some embodiments, the current drawn from the coils during any given cycle is approximately equal for both directions of piston movement. In some embodiments, the current drawn from the coils will be higher during the part of the piston stroke when the high pressure valves are open. By using a low friction free piston and minimal or no external seals, parasitic losses are reduced, enabling power production at low temperature differentials. In some embodiments, the piston may achieve reciprocating speeds of 3600 cycles per minute to produce AC current at a preferred frequency of 60 Hz. In some embodiments, multiple rows of coils may be used to create more than one electrical pulse per stroke and allow lower engine speeds while maintaining 60 Hz AC output. Higher and lower speeds are also possible.

The temperature differential between the hot reservoir 106 and the cold reservoir 108 must be high enough to produce adequate pressure to develop enough kinetic energy to overcome parasitic loses in the system. The working fluid may be air or another compressible fluid such as, but not limited to helium, hydrogen, nitrogen, CO2 or supercritical CO2. The mass of working fluid may be measured by any means, including for example, by measurements from sensor inputs measuring pressure, temperature and change of volume via the piston position. The hot reservoir 106 may be an internal combustor or heat exchanger or both together and there may be one or more of each.

The cold reservoir 108 may be ambient air. The valves 126, 128, 130, 132 may be mechanically or electrically actuated. For example, the valves may be mechanically controlled rotary valves which preferably spin at a constant speed (during steady state operation) and in a single direction or solenoid valves. In some embodiments the piston 110 may be controlled mechanically, for example with a crankshaft and connecting arms. The piston 110, may have a greater surface area at one end than the other but preferably has the same diameter and surface area at both ends, which allows for a simple design. As conditions change during operation of the energy transfer machine the piston average axial position may vary. For example, during operation of the machine, the piston average position may migrate towards the hot end 116 of the cylinder 112 to affect the maximum volume and compression ratio at both ends of the cylinder. The piston 110 projects past the valves during certain phases so that the high pressure spikes when the piston 110 bounces against the hot and cold ends 116, 118 of the cylinder 112 is contained between the body 102 and the piston 110 and the additional pressure is not borne by the valves. A portion of each of the hot and cold ends 116, 118 of the cylinder 112 extend beyond the valves 126, 128, 130, 132. The cold end 118 may have a longer bounce length because the piston 110 stores kinetic energy for the return stroke. Insulation or a vacuum may be placed around the cylinder to conserve heat of the system, especially at the ends 116, 118 where temperature peaks during the bounce. The piston 110 may have expandable ends to more tightly seal during the bounces at each end of the cylinder 112. Rebound devices 140 may be provided at the ends of the cylinder.

As seen in FIG. 1, the energy transfer machine 100 has a hot reservoir 106 and cold reservoir 108 that define a path. Fluid has a unidirectional flow through the path. The unidirectional flow allows heating and cooling to happen gradually and preferably over two or more cycles of the machine 100. The piston 110 has the same cross-sectional area on the opposed ends of the piston 110. Having ends of the piston 110 with the same cross-sectional area provides a simple design, with fewer components. Valve timing rather than piston area achieves variable displacement of fluid through the path. Variable piston stroke allows the hot and cold cylinder ends 116, 118 to have different virtual displacements and therefore variable power outputs and requirements. The piston amplitude can be varied in response to different parameters such as heat gain and power out. For an electrical current output application, frequency and therefore AC current frequency may be maintained by modulating the piston oscillation amplitude. The energy transfer machine 100 may be operated at a wide variety of system pressures, piston displacements, temperature differentials including exceptionally low absolute and differential temperatures.

Various sensor arrangements may be used to determine the optimum fluid flow through each of the flow control valves 126, 128, 130, 132. Some energy may be lost in the pulsating of fluid in the heat exchangers. Pulse chambers may be used to reduce the energy lost. Piston speed and amplitude can be adjusted to optimize the pulse flow characteristics through the reservoir/heat exchangers.

If at an initial start up sequence there is insufficient pressure differential to create movement of the piston 110, then electrical current may be supplied to the input-output device 136 to begin the piston oscillation. If the pressure differential in the system is sufficiently high, the engine may be started by opening and closing the valves 126, 128, 130, 132 in order to create movement of the piston 110. Coils of the input-output device 136 may be used as linear motor coils until the piston 110 is oscillating at operating speed. During the startup phase, the piston amplitude, frequency and mass of airflow may be gradually increased from a stationary state. Coils of an input-output device 136 may be used during the normal power cycle to increase or decrease the piston kinetic energy or to affect movement or position in order to change operational characteristics.

The input-output device 136 may be used to magnetically suspend the piston 110. Suspending the piston 110 magnetically allows the input-output device 136 and magnets of the piston to work together as magnetic bearings. When the electromagnetic coils are used as magnetic bearings the electromagnetic coils may be arrayed around the cylinder 112. Electric coils for power generation may be located anywhere on the cylinder 112 including at the ends of the cylinder 112.

Figure 2:
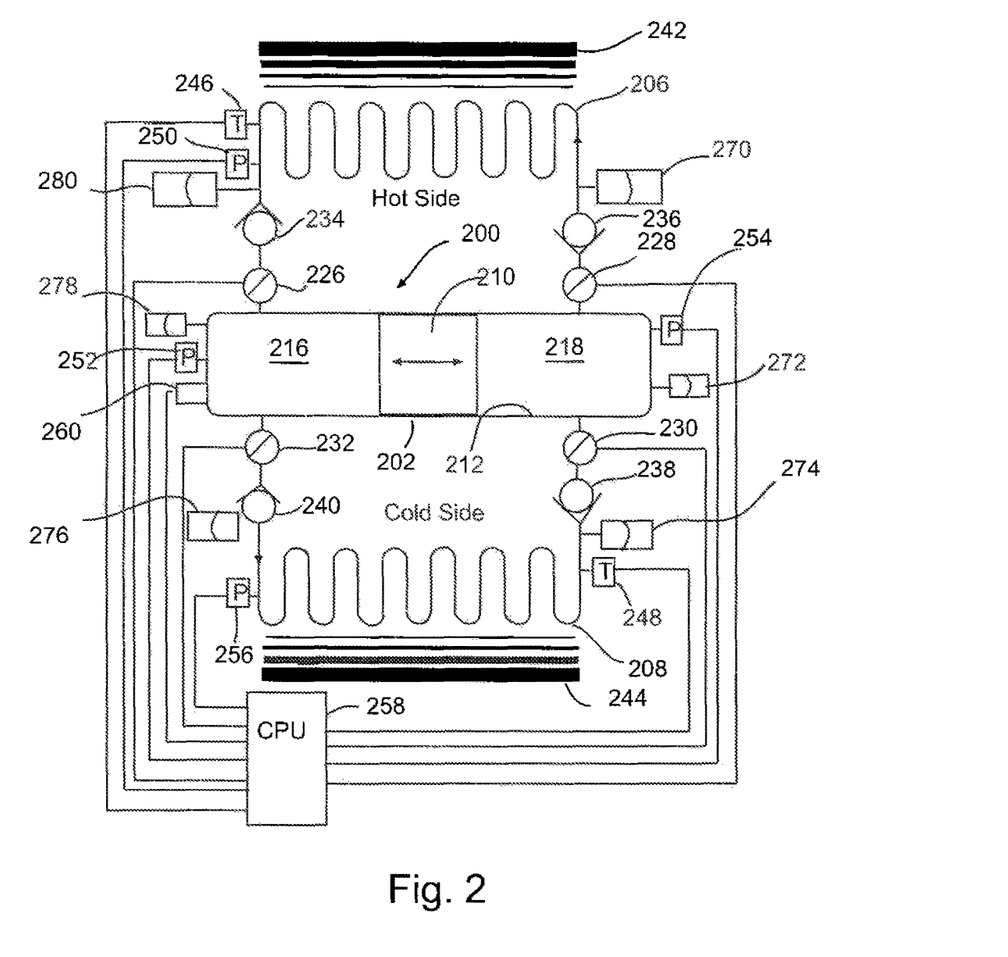
FIG. 2 a schematic of a second embodiment of an energy transfer machine for use with a liquid that is relatively incompressible.

Valve operation is shown schematically and may also be achieved by use of the spinning piston or rotary valve or other valves disclosed in US publication no. 2009-0165461. The various phases of movement of the piston or diaphragm are also shown in FIG. 12 of the same US publication. The fluid used in the embodiment of FIG. 1 may be a compressible fluid such as a gas, an incompressible fluid such as water or oil, or another fluid such as supercritical CO2. When used with a relatively incompressible fluid, the circuit should be used with accumulators such as shown in FIG. 2 to enable changes of the volume of the fluid to be accommodated without sharp changes in pressure. Accumulators may be provided by expandable tubing or any suitable conventional hydraulic accumulator may be used.

FIG. 2 shows a schematic drawing of an energy transfer machine 200 for use with a liquid such as water that is relatively incompressible compared with a gas. A piston 210 is set within a cylinder 212 in a body 202. The cylinder 212 has a hot end 216 and a cold end 218. A first heat exchanger 206 forms an energy transfer circuit with the piston 210. A second heat exchanger 208 forms an energy transfer circuit with the piston 210. Together the first and second heat exchangers 206 and 208 form a path. The first heat exchanger 206 receives thermal energy from a heat source 242. The second heat exchanger 208 dissipates thermal energy into a heat sink 244. A hot fluid inlet valve 226 and a check valve 234 separate the hot end 216 of the cylinder 212 with the first heat exchanger 206. The check valve 234 prevents fluid from flowing from the hot end 216 of the cylinder 212 into the first heat exchanger 206 when the hot fluid inlet valve 226 is open. A cold fluid discharge valve 228 and a check valve 236 separate the cold end 218 of the cylinder 212 with the first heat exchanger 206. The check valve 236 prevents fluid from flowing from the first heat exchanger 206 into the cold end 218 of the cylinder 212 when the cold fluid discharge valve 228 is open. Similarly, a cold fluid inlet valve 230 and a hot fluid discharge valve 232 connect the cylinder 212 and the second heat exchanger 208. Check valves 238, 240 operate to prevent fluid from flowing into and out of the second heat exchanger 208, respectively, under the same principles as check valves 234, 236. The operation of the valves 226, 228, 230, 232 is the same as the operation of the valves 126, 128, 130, 132 described in the embodiment shown in FIG. 1. The input-output device of FIG. 2 is not shown, but may be such as described in relation to FIG. 1.

Temperature sensor 246 and pressure sensor 250 detect the temperature and the pressure of the fluid in the first heat exchanger 206 prior to being input into the hot end 216 of the cylinder 212. Temperature sensor 248 detects the temperature of the fluid in the second heat exchanger 208 prior to being input into the cold end 218 of the cylinder 212. Pressure sensor 256 detects the pressure of the fluid in the second heat exchanger 208 after being discharged from the hot end 216 of the cylinder 212. Pressure sensor 252 detects the pressure in the hot end 216 of the cylinder 212. Pressure sensor 254 detects the pressure in the cold end 218 of the cylinder 212. A piston position sensor 260 detects the position of the piston 210 in the cylinder 212. A processor 258 is connected to each of the pressure sensors 250, 252, 254, 256, the temperature sensors 246, 248, the piston position sensor 260 and the valves 226, 228, 230 and 232. The processor 258 opens and closes the valves 226, 228, 230, 232 according to the readings of the various sensors, for example, implementing the method of opening and closing valves described in relation to FIG. 1. The processor 258 may be configured to seek the ideal efficiency by oscillating the individual valve timing in order to find the highest output. The device 200 may also use rebound devices or other elements of FIG. 1. One or more accumulators 270, 272, 274, 276, 278, 280 may be used to mitigate pressure variations of the fluid in the circuit of FIG. 1.

The accumulators may be used on the cold and/or hot sides of the circuit to allow liquid to flow in and out of the heat exchanger/reservoirs at different times. An accumulator in one or both ends of the piston may also be advantageous to allow the piston to move when the valves are closed at one or both ends of the piston during certain phases of the cycle. Other methods of providing an accumulator effect or accommodation of volume changes to reduce the pulsation effects that may occur in a liquid medium to a greater extent than in a more compressible medium include using piping material for the heat exchangers and/or reservoirs that is able to expand to account for pressure pulses, or by entraining compressible gas into the liquid medium.

The energy transfer machine 100 or 200 may also be used as heat pump such as for cooling. The operation of the energy transfer machine 100 or 200 in operation in the cooling operations is similar, except that the heat energy transfers to and from the heat exchangers/reservoirs in the opposite direction. Movement of the piston is used to create motion of the fluid through the path. The machines 100 and 200 may also be operated in the manner shown in US publication no. 2009-0165461 for cooling, pumping, compression or power generation. The piston may be replaced by coupled pistons, a diaphragm or an electrically energized deformable diaphragm.

The heat source used to create a difference in temperature between the hot reservoir 106 or hot source 242 and the cold reservoir 108 or cold sink 244 may be from a variety of heat sources. The heat may be provided by a naturally occurring heat differential such as a) the difference between night and day heat produced by storing and using heat energy in liquid or solid masses such as water reservoirs, b) the difference between ambient air and sub-ground temperature, c) the difference between water surface and deeper water, and d) the difference between solar heated and shaded areas above ground or in space applications. The heat may be provided by a waste heat from various applications, such as a) waste heat from an industrial process, b) heat created from combusting fuels, c) heat created by an onboard electrical or other power source for land, ocean or space vehicles, d) heat generated by electrically driven devices, including, for example, computers, e) the difference in temperature in a building as compared to sub-ground or ambient air temperature and f) concentrated solar power generation. For example, the energy transfer machine may produce energy from the temperature differential that exists between night and day. Water reservoirs may be used as heat sinks and to store heat energy during the day when ambient air and solar heat provide energy to heat the hot exchanger. A reservoir of cold water may be used to cool the reservoir 108 or 244. The hot exchanger or reservoir 106 may be warmed by daytime air temperature, and may receive direct solar heating. The water heats up throughout the day until the increasing temperature of the water becomes too similar to the decreasing temperature of the air in the evening that it is no longer possible to generate power with the energy transfer machine. When the air temperature drops sufficiently below the now-heated water temperature, the energy transfer machine the cycle is reversed. The cycle may be reversed by configuring valves to redirect air from each of the reservoirs into the opposite engine valves, or by reversing the airflow, or the cycle may be reversed while maintaining the same direction of fluid flow by timing the valves so that the hot side of the cylinder is switched to the cold side of the cylinder and visa verse, meaning that the end that was compressing is now expanding and visa versa. The stored heat in the water reservoir dissipates into the cooler night air and will provide energy throughout the night to operate the energy transfer machine until the decreasing temperature of the water reservoir nearly reaches the increasing temperature of the air in the morning.

By using more than one water reservoir, energy may be stored in the form of heat and used during high demand hours. For example, one water reservoir may be heated during the hottest hours of the day and reserved for use during peak hours such as early morning when the air temperature is cool. Similarly, another water reservoir may be cooled at night to the temperature of the coldest night air and stored for use during the peak demand hours of the following day when the temperature is much higher. Heating and cooling these reservoirs may be done during hours of lower electrical demand when the energy transfer machine can, for example, be run at high speed to provide the fastest possible heat transfer with little energy being used to produce electricity for external use. Two or more of these or other heating and cooling sources may be used in combination.

The energy transfer machine may be used as a small-scale or large-scale thermal energy storage device for converting electrical energy into heat energy during low electrical demand hours and then back to electrical energy again during high electrical demand hours. In other embodiments, heating elements may be used to heat thermal mass and the energy transfer machine may be used to convert this heat energy to electricity at another time.

By using a liquid fluid such as, but not limited to, water as a working medium, high pressure differentials can be achieved with a wide range of temperature differentials. By using water as a working fluid, it may also be possible to generate piston movement as a result of the expansion of water below 0 deg Celsius. In this case, the medium would expand as it drops in temperature instead of when it increases in temperature. To allow movement of frozen water through the system, an emulsion of a non freezing hydrophobic liquid such as oil or gasoline can be used as a kind of liquid matrix to carry small particles of ice. The ice may or may not melt as part of the process. In this embodiment, mixing means will be necessary to keep the water droplets and/or ice particles small enough and suspended in the liquid matrix.

An advantage of the energy transfer device of FIG. 1 or 2 engine as a liquid fluid device is the possibility of using large volume heat exchanger/reservoirs to enable the use of large fluid volumes. The unobvious advantage of these large fluid volumes is the high piston displacement that can be achieved with relatively low differential pressures. For example, if a 1 liter total volume system generates a 1 cm piston displacement as the hot reservoir/heat exchanger increases temperature by a given amount, a 10 liter total system volume can generate 10 cm of piston travel, and 100 Liters would generate 100 cm, etc. Also, unlike Sterling engine cycles, the high liquid volume can heat up and cool down gradually allowing inexpensive heat exchangers (such as, but not limited to, lengths of common pipe) to be used. A further advantage of such a system is the high cycle frequency that can be achieved due to the gradual temperature change characteristic which does not require fluid to change temperature from hot to cold on every cycle.

For any liquid fluid device of the type disclosed here, several special considerations may increase the performance of the machine. These include using a piston of considerable mass to generate the inertial forces necessary during the cycle phases where energy is imparted from one end of the piston to the other as a result of the acceleration and deceleration of the piston. The disclosed energy transfer machine provides efficiency and performance over a wide range of operating parameters as a result of using variable stroke length as opposed to different piston areas on both compression and expansion pistons. This requires the piston velocity to be quite high for a light weight piston but the piston velocity can be lower if the piston mass (or a reciprocating or rotary mass attached to the piston) is increased. Different piston displacements can also be used, but this will add complexity and limit the range of operating parameters in which the disclosed energy transfer machine will be effective. The energy transfer machine may operate at atmospheric pressure or lower. The disclosed energy transfer machine may operate as an open circuit engine with an internal combustion process such as a combustor similar to those used with a rotary turbine engine. The disclosed energy transfer machine may operate as a path system which uses the expansion of a liquid, without a phase change, instead of a gas. Expansion of the liquid can be as a result of heating the liquid, or with water, by cooling the water near freezing or even freezing the water (preferably as a ice-slurry mixture with an insoluble liquid such as oil). As shown in the liquid engine schematic, this embodiment may benefit from having pressure accumulators at one or more places in the circuit.

Figure 3:
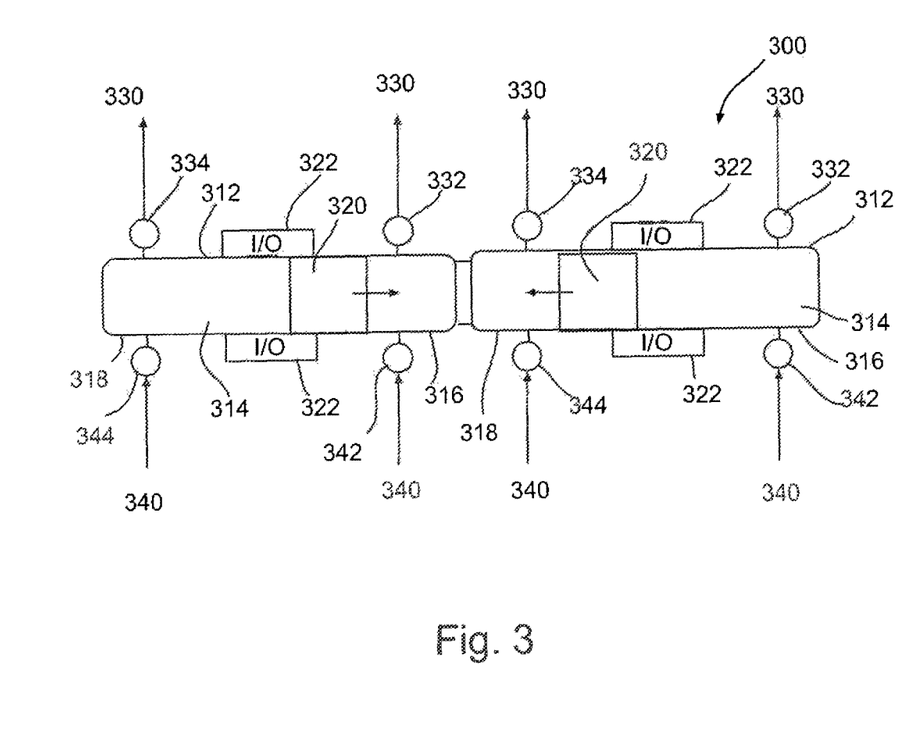
FIG. 3 a schematic of a second embodiment of an energy transfer machine used as a compressor or compressed fluid driven alternator.

A compressor or compression driven engine is shown in FIG. 3. An energy transfer machine 300 is shown with identical units side by side to reduce vibrations. Each unit comprises a pressure chamber 312 in the form of a cylinder 314. Each cylinder 314 has a first end 316 and a second end 318, and a pressure responsive element 320 such as a diaphragm or piston placed for reciprocal motion within the cylinder 314. The pressure responsive element 320 separates the first end 316 of the cylinder 314 from the second end 318 of the cylinder 314. An input-output device 322 is coupled to the pressure responsive element 320 for example by electromagnetic coupling for converting the reciprocal motion of the pressure responsive element 320 into electrical energy or electrical energy into reciprocal motion of the pressure responsive element 320. A high pressure zone 330 such as a pressure chamber communicates with the cylinder 320 through a first high pressure valve 332 on the first end 316 of the cylinder 314 and a second high pressure valve 334 on the second end 318 of the cylinder 314. A low pressure zone 340, which may be ambient air, or another pressure chamber, communicates with the cylinder 314 through a first low pressure valve 342 on the first end 316 of the cylinder 314 and a second low pressure 344 valve on the second end 318 of the cylinder 314. The first high pressure valve 332, the second high pressure valve 334, the first low pressure valve 342 and the second low pressure valve 344 are operable to convert pressure in the high pressure zone 330 into electrical energy produced by motion of the pressure responsive element 320 or to convert electrical energy into motion of the pressure responsive element 320 that pressurizes the high pressure zone 330.

Thus, as either element 320 moves to the right in FIG. 3 with valve 342 closed, end 316 is pressurized and valve 332 opens when the pressure in end 316 is higher than the pressure in the high pressure zone 330. In order to conserve energy valve 332 may then be closed when the pressure in end 316 exceeds the pressure in the high pressure zone 330 by a predetermined value. After the conclusion of the right going stroke of element 320, element 320 traverses to the left of FIG. 3 and valve 342 opens to draw air or other gas into the end 316 when the pressure in the end 316 drops below the pressure in low pressure zone 340. Motion of the element 320 is caused by the input-output device 322, which may be coils of an alternator cooperating with magnets on the element 320. As the element 320 moves left with valve 344 closed, end 318 pressurizes and when the pressure in end 318 exceeds the pressure of high pressure zone 330, valve 334 opens to release gas into the high pressure zone 330. In order to conserve energy valve 334 may then be closed when the pressure in end 318 exceeds the pressure in the high pressure zone 330 by a predetermined value. After the end of the left going stroke of element 320, when the pressure in end 318 drops below the pressure in low pressure zone 340 valve 344 opens to draw air or other gas into the end 318 as the element 320 traverses to the right. Rebound elements (not shown, but see FIG. 1) may be provided at the ends of the cylinders 314 or in the moving element 320 to assist in the change of direction of the element 320, and the valves 332, 334, 342 and 344 are also offset from the ends of the cylinders 314 so that air or gas pressure at the end of the strokes helps the element 320 reverse direction. Control of the valves may be by any suitable valve controller such as the controller of FIG. 1 or 2 programmed as described here. The valves may be any suitable valves and may be incorporated in the moving element 320 as disclosed in US publication no. 2009-0165461.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

What is claimed is:

1. An energy transfer machine comprising:
    a pressure chamber comprising a cylinder, the cylinder having a first end and a second end, and a pressure responsive element placed for reciprocal motion within the cylinder, the pressure responsive element separating the first end of the cylinder from the second end of the cylinder;
    an input-output device coupled to the pressure responsive element for converting the reciprocal motion of the pressure responsive element into electrical energy or electrical energy into reciprocal motion of the pressure responsive element;
    a high pressure zone communicating with the cylinder through a first high pressure valve on the first end of the cylinder and a second high pressure valve on the second end of the cylinder;
    a low pressure zone communicating with the cylinder through a first low pressure valve on the first end of the cylinder and a second low pressure valve on the second end of the cylinder; and
    the first high pressure valve, the second high pressure valve, the first low pressure valve and the second low pressure valve being operable to convert pressure in the high pressure zone into electrical energy produced by motion of the pressure responsive element or to convert electrical energy into motion of the pressure responsive element that pressurizes the high pressure zone.

2. The energy transfer machine of claim 1 in which the low pressure zone is an open circuit.

3. The energy transfer machine of claim 1 in which the low pressure zone and high pressure zone are part of a closed path.

4. The energy transfer machine of claim 1 in which the movable element comprises a diaphragm.

5. The energy transfer machine of claim 1 in which the pressure responsive element comprises a free piston.

6. The energy transfer machine of claim 5 in which the free piston has ends with equal surface area.

7. The energy transfer machine of claim 1, further comprising:
    a first accumulator on the high pressure zone to accommodate pressure variation in the high pressure zone; and
    a second accumulator on the low pressure zone to accommodate pressure variation in the low pressure zone.

8. The energy transfer machine of claim 1, further comprising a control system configured to send control signals to the first high pressure valve, the second high pressure valve, the first low pressure valve, and the second low pressure valve,
    the first high pressure valve, the second high pressure valve, the first low pressure valve, and the second low pressure valve opening and closing in response to control signals from the control system.

9. The energy transfer machine of claim 1, further comprising a first rebound spring and a second rebound spring, the first rebound spring lying within the cylinder between the first end of the cylinder and the pressure responsive element and the second rebound spring lying with the cylinder between the second end of the cylinder and the pressure responsive element.

10. The energy transfer machine of claim 9 in which the first rebound spring comprises the first low pressure valve, the first high pressure valve being offset from the first end of the cylinder, and the second rebound spring comprises the second low pressure valve, the second high pressure valve being offset from the second end of the cylinder so that gas pressure at the respective first end and second end of the cylinder helps the pressure responsive element reverse direction.

* * * * *